United States Patent [19]

Bernier et al.

[11] Patent Number: 4,469,441
[45] Date of Patent: Sep. 4, 1984

[54] SCANNING MONOCHROMATOR SYSTEM WITH DIRECT COUPLED DISPERSING ELEMENT-ELECTROMAGNETIC DRIVE TRANSDUCER ASSEMBLY

[75] Inventors: John A. Bernier, Lexington; Garry C. Kunselman, Stow; Karl W. Kaltenbach, Newtonville, all of Mass.

[73] Assignee: Allied Corporation, Morristown, N.J.

[21] Appl. No.: 354,725

[22] Filed: Mar. 4, 1982

[51] Int. Cl.³ .......................... G01J 3/18; G01N 21/73
[52] U.S. Cl. ...................................... 356/316; 356/334
[58] Field of Search ................. 356/51, 316, 332, 334, 356/319, 326, 328

[56] References Cited

U.S. PATENT DOCUMENTS

| | | | |
|---|---|---|---|
| 2,562,525 | 7/1951 | Cary | 356/51 X |
| 2,723,589 | 11/1955 | Bullock et al. | 356/326 X |
| 2,741,941 | 4/1956 | Madsen et al. | 356/51 X |
| 3,229,563 | 1/1966 | De Mey | 88/14 |
| 3,414,356 | 12/1968 | Cary | 356/100 |
| 3,502,890 | 3/1970 | Hedelman | 250/228 |
| 3,664,742 | 5/1972 | Witte et al. | 356/332 |
| 3,695,764 | 10/1972 | Delmas et al. | 356/334 X |
| 3,868,499 | 2/1975 | Aaronson et al. | 356/334 X |
| 4,012,145 | 3/1977 | Chabannes et al. | 356/88 |
| 4,070,112 | 1/1978 | Tsunazawa et al. | 356/319 |
| 4,142,144 | 2/1979 | Rohr | 324/61 R |
| 4,211,486 | 7/1980 | Magnussen, Jr. et al. | 356/334 X |

FOREIGN PATENT DOCUMENTS 48624 4/1980 Japan .................................. 356/328

OTHER PUBLICATIONS

Floyd et al., *Analytical Chemistry*, vol. 52, No. 3, Mar. 1980, pp. 431–438.

Primary Examiner—F. L. Evans

[57] ABSTRACT

A scanning monochromator system comprises a housing, structure defining entrance and exit apertures, and a radiation dispersing component in the housing arranged to disperse radiation passing through the entrance aperture into a spectrum for transmission towards the exit aperture. The dispersing element is directly coupled to an electromagnetic drive transducer with the assembly of a rotary component of the drive transducer and the dispersing component being mounted for rotation as a unit about a stationary axis that is perpendicular to the optical axis of the system so that a selected portion of the radiation dispersed by the dispersing component is passed through the exit aperture. The drive transducer is arranged to move a selected portion of dispersed radiation at the exit aperture over a wavelength range of at least 3000 angstroms with a reproducible accuracy of better than 0.03 angstroms in less than one second.

21 Claims, 7 Drawing Figures

SCANNING MONOCHROMATOR SYSTEM WITH DIRECT COUPLED DISPERSING ELEMENT-ELECTROMAGNETIC DRIVE TRANSDUCER ASSEMBLY

This invention relates to spectroanalytical systems and more particularly to spectroanalytical systems of the scanning monochromator type.

Monochromator systems produce high spectral purity (narrow bandwidth) radiation, of accurately known wavelength. Such systems essentially consist of a fixed entrance aperture, a collimator, a dispersing component, a focusing component, and an exit slit. In a scanning monochromator, the wavelength at the exit slit of the high spectral purity radiation beam is adjusted by rotating the dispersing element, and typically that angular adjustment varies that wavelength over a range of several thousand angstroms in wavelength increments of 0.1 angstroms and less, with the dispersing element being stably and accurately maintained at each such incremental angular position.

In a diffraction grating monochromator, the following well-known relationship exists:

$$n\lambda = 2d \cos \alpha \sin \theta$$

where
n is the order of the spectrum;
$\lambda$ = the wavelength;
d = grating line spacing;
$\alpha$ = half the angle between the incident and diffracted beams; and
$\theta$ = the angle between the normal to the grating and the line bisecting the incident and diffracted beams.

The diffraction grating has conventionally been mounted on a stable platform and rotated by a drive motor through a mechanical drive assembly that includes a lead screw and sine bar drive arrangement.

In accordance with the invention, there is provided a highly accurate scanning monochromator system that includes a housing, structure defining entrance and exit apertures, and a radiation dispersing component in the housing arranged to disperse radiation passing through the entrance aperture into a spectrum for transmission towards the exit aperture. The dispersing element is directly coupled to an electromagnetic drive transducer with the assembly of a rotary component of the drive transducer and the dispersing component being mounted for rotation as a unit about a stationary axis that is perpendicular to the optical axis of the system so that a selected portion of the radiation dispersed by the dispersing component is passed through the exit aperture. In a particular embodiment, the monochromator system is of the atomic emission type and includes a collimating component disposed to receive divergent rays of radiant energy passed through an entrance aperture and to render those divergent rays substantially parallel, the radiation dispersing component is arranged to receive the substantially parallel rays from the collimating component and to disperse those rays into a spectrum; and a focusing component is arranged to receive dispersed radiation and to focus that dispersed radiation to form a spectral image adjacent the exit aperture. A digital input signal of at least sixteen binary digits generates a desired dispersing component angular position signal, a position transducer coupled to the drive transducer produces an output signal indicative of the angular position of the rotor-dispersing component assembly, and servo-amplifier circuitry responsive to the angular position input signal and the position transducer output signal accurately positions the rotor-dispersing component assembly at the desired angular position.

In preferred embodiments, the monochromator has a wavelength range of at least 3000 angstroms and a speed of at least f 20, and the dispersing component is a diffraction grating that has at least 50 grooves per millimeter. The mass of the grating, which must be sufficient to insure its optical stability, is greater than that of the rotary component of the drive transducer. The direct drive arrangement allows complete scanning by the grating over the entire wavelength range in less than one second. Each particular wavelength of interest is accurately identified by a binary number that is generated by a system controller and that binary number, through a digital-to-analog converter, generates an analog signal which, together with a feedback signal from a position transducer coupled to the grating-drive transducer assembly, is applied to a summing point of a servo-amplifier.

In a particular embodiment, the grating drive transducer is a limited rotation motor having a torsion bar which resiliently supports both the rotor and the grating for rotation, and the position transducer is a capacitance rotor position transducer. The servo-amplifier includes a differential amplifier responsive to the capacitance position transducer, a second summing point which an error rate signal is summed with the error signal, and an integrator stage; and the system positions the grating at any particular wavelength of interest with an accuracy of better than 0.1 angstrom in less than one second.

Optical components of the monochromator are preferably housed in an enclosure which provides environmental isolation (thermal and mechanical stability) and electromagnetic shielding. Heater pads on the walls of the insulated tank enclosure are energized by a temperature controller responsive to a temperature sensor within the enclosure to maintain the temperature in the enclosure at a predetermined value.

In accordance with another feature of the invention, the system also employs a plurality of sensors that have different sensitivities to different portions of the spectral wavelength range of the analysis system, the controller selecting a particular sensor as a function of the wavelength of interest. In a particular embodiment, a series of exit apertures are employed, each with an associated photomultiplier type sensor, and the controller compensates for the change in the grating equation due to the angular offset of the selected exit aperture.

In accordance with a further feature of the invention, support structure for the dispersing component-direct drive assembly includes first adjustment means to rotate the assembly about its axis of rotation, and second and third adjustment means for tilting the assembly about a fixed pivot offset from the assembly axis in two mutually perpendicular planes. In a particular embodiment, the support structure includes a support plate that is biased against a spherical bearing surface that defines the fixed pivot, each of the second and third adjustment means tilting the support plate relative to that spherical bearing surface; and the rotary adjustment includes a support disc that is fixed to the grating-motor assembly and is mounted for rotation, together with biasing means which urges the assembly against an adjustable angular reference member.

In a particular embodiment, the system includes an induction coupled plasma type of sample excitation source into which a spectroscopic sample to be analyzed is introduced to raise the sample to spectroemissive levels, a calibrating radiation source having a plurality of discrete known spectral lines, and means for selectively directing radiation from the calibrating source to the entrance aperture of the monochromator system.

Other features and advantages will be seen as the following description of a particular embodiment progresses, in conjunction with the drawings, in which.

DESCRIPTION OF PARTICULAR EMBODIMENT

Figure 1:
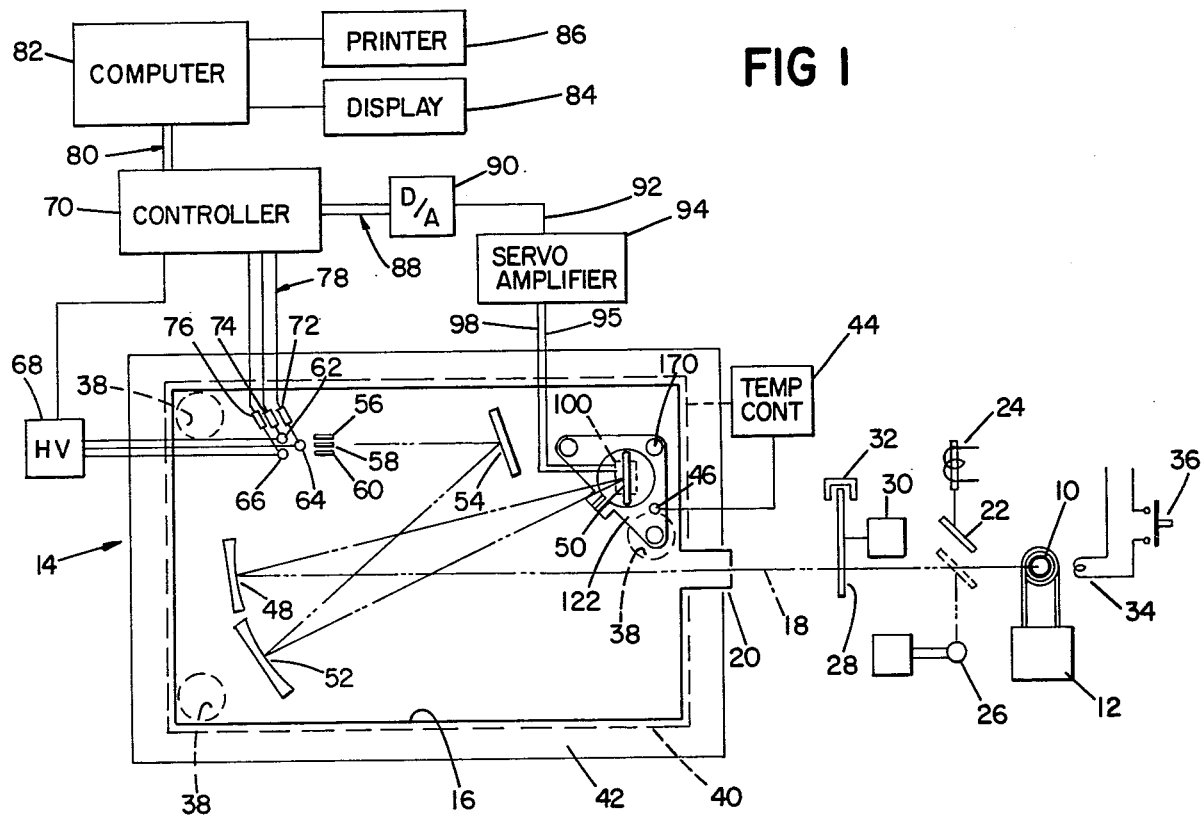
FIG. 1 is a diagram of a spectral analysis system in accordance with the invention.

Shown in FIG. 1 is an atomic emission spectroanalysis system for performing elemental analysis on a wide variety of samples. The sample excitation source 10 is an argon plasma which is created by inductively coupling energy from RF generator 12 to a stream of argon gas carrying an aerosol of the sample solution. The radiation emitted by the elements excited by the plasma is sensed by scanning monochromator and photometric measuring system 14 that is housed within enclosure 16. Radiation from emission source 10 passes along axis 18 through entrance slit 20 into enclosure 16. Mirror 22 is normally spaced from axis 18 and may be positioned on axis 18 by energization of solenoid 24 to reflect radiation from calibrating radiation source 26 along axis 18 through slit 20. Disc 28, which carries a series of order sorting filters disposed around its periphery is positioned adjacent axis 18 and rotated by motor 30. Sensor 32 provides an output that indicates the particular filter device positioned on optical axis 18. RF generator 12 provides 2.5 KW of RF power to that plasma, and energization of tesla coil 34 in response to closing of switch 36 ignites the plasma. Argon and water pressure switches are interlocked with the start-up and shut-down circuitry of RF generator 12.

Monochromator enclosure 16 is a cast iron tank of about 270 pounds weight and is supported on three air bag type vibration isolators 38. A purging system supplies argon or nitrogen to the sealed tank enclosure at a pressure of about 1½ psig, the purge gas being flowed through a heat exchanger for interchange with exiting gas to warm the entering gas to the system temperature. Heater blankets 40, covered with insulation 42, are energized by temperature controller 44 which responds to temperature sensor (thermistor) 46 to maintain the enclosure temperature at 35°±0.1° C.

Housed within enclosure 16 are collimating mirror 48, diffraction grating 50, focusing mirror 52, folding mirror 54, and an array of three exit slits 56, 58, 60, each aligned with a corresponding photomultiplier tube 62, 64, 66 respectively. Connected to each photomultiplier tube is a high voltage power supply 68 whose output is adjustable by controller 70 to the high voltage appropriate for the particular analytical line of interest. Each photomultiplier has an output through amplifier circuit channels 72, 74, 76 respectively over output lines 78 to controller 70. Coupled to controller 70 via RS 232 serial line 80 is an Apple II computer 82 with a 48K RAM and two 126K floppy discs. Output devices coupled to computer 82 include video monitor display 84 and printer 86. Controller 70 includes two 16 bit microprocessors (8086 and 8087) with up to 64K of RAM and 32K of ROM. Controller 70 provides an eighteen bit output over cable 88 to digital-to-analog convertor 90 (Analog Devices DAC 1138K) and the output of convertor 90 is applied over line 92 to servo-amplifier 94 which energizes limited rotation motor 100 over drive signal cable 95. Grating 50 is directly mounted on the output shaft 96 of motor 100. Motor 100 includes a rotor position transducer which generates output signals over cable 98 to servo-amplifier 94.

Figure 2:
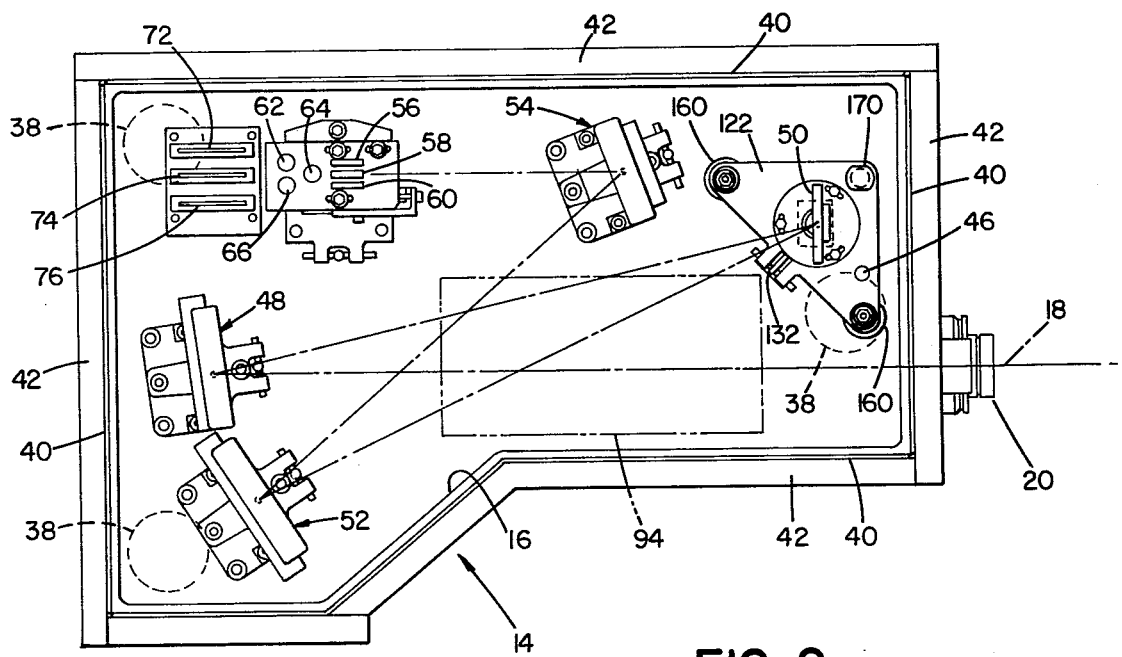
FIG. 2 is a top plan view of the monochromator enclosure employed in the system shown in FIG. 1.

Further details of monochromator 14 may be seen with reference to FIG. 2. Tank casting 16 has an overall length of about eighty centimeters and a width of about fifty-five centimeters. The monochromator is of the crossed Czerny-Turner design and has a focal length of 0.75 meter and a speed of f8. In a particular embodiment, grating 50 has 1200 grooves per millimeter to give a dispersion in the first order of 10.2 angstroms per millimeter. The grating body is a glass plate (Schott Type Zerodur) about 7.5 centimeters wide, about nine centimeters high and about 0.6 centimeter thick that is secured to aluminum support 102 with RTV type adhesive. Entrance slit 20 and exit slits 56, 58, and 60 are each 25 microns in width. Photomultiplier tube 62 (visible) is a type R300 tube; center photomultiplier tube 64 is a type R889 tube; and photomultiplier tube 66 (UV) is a type R427 tube. The wavelength ranges, orders, tube types and filter types used for analytical and width range scans are as follows:

| START | STOP | ORDER | TUBE TYPE | TUBE LOCATION | FILTER TYPE |
|---|---|---|---|---|---|
| 1. ANALYTICAL | | | | | |
| 170 | 260 | 2 | R427 | UV | NONE |
| 260 | 280 | 2 | R427 | UV | CORAX |
| 280 | 380 | 2 | R300 | VIS | BG3 |
| 380 | 450 | 1 | R300 | VIS | BG3 |
| 450 | 780 | 1 | R889 | CENTER | L-42 |
| 2. WIDE RANGE SCANS | | | | | |
| 170 | 260 | 2 | R427 | UV | NONE |
| 260 | 300 | 2 | R427 | UV | CORAX |
| 300 | 380 | 2 | R300 | VIS | BG3 |
| 380 | 450 | 1 | R300 | VIS | BG3 |
| 450 | 780 | 1 | R889 | CENTER | L-42 |

The exit slit is selected at the beginning of each analysis for optimum photomultiplier tube response for the wavelength of interest, controller 70 automatically enabling the appropriate photomultiplier tube, order sorting filter, associated channel card and high voltage level.

Figure 3:
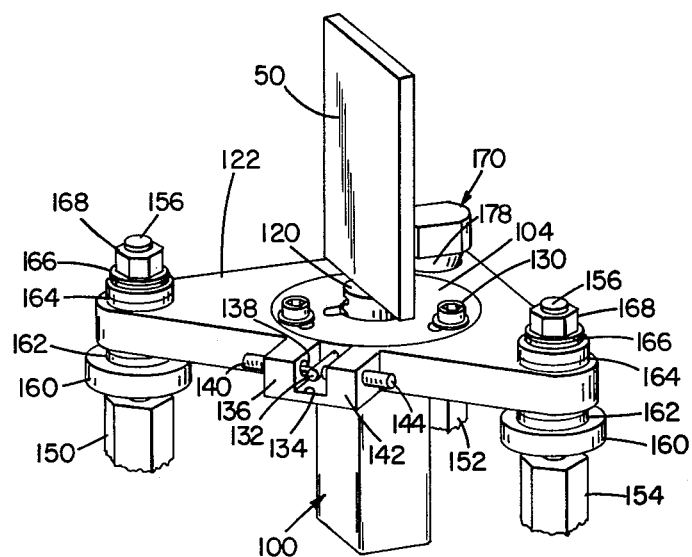
FIG. 3 is a perspective view of the motor-grating assembly and its support.
Figure 4:
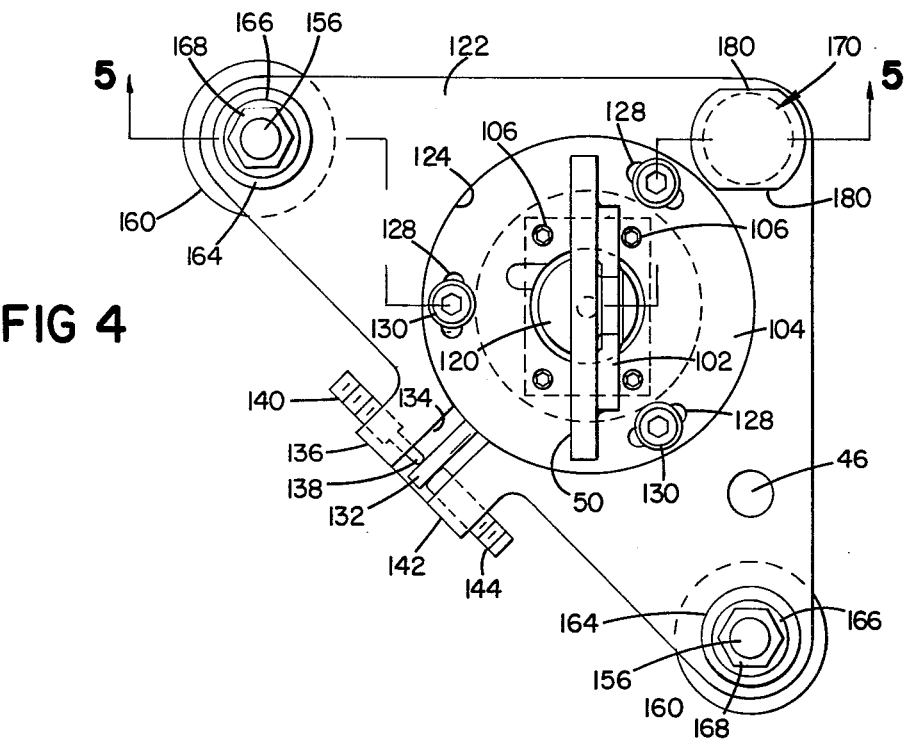
FIG. 4 is a top plan view of the grating-drive motor assembly and support.
Figure 5:
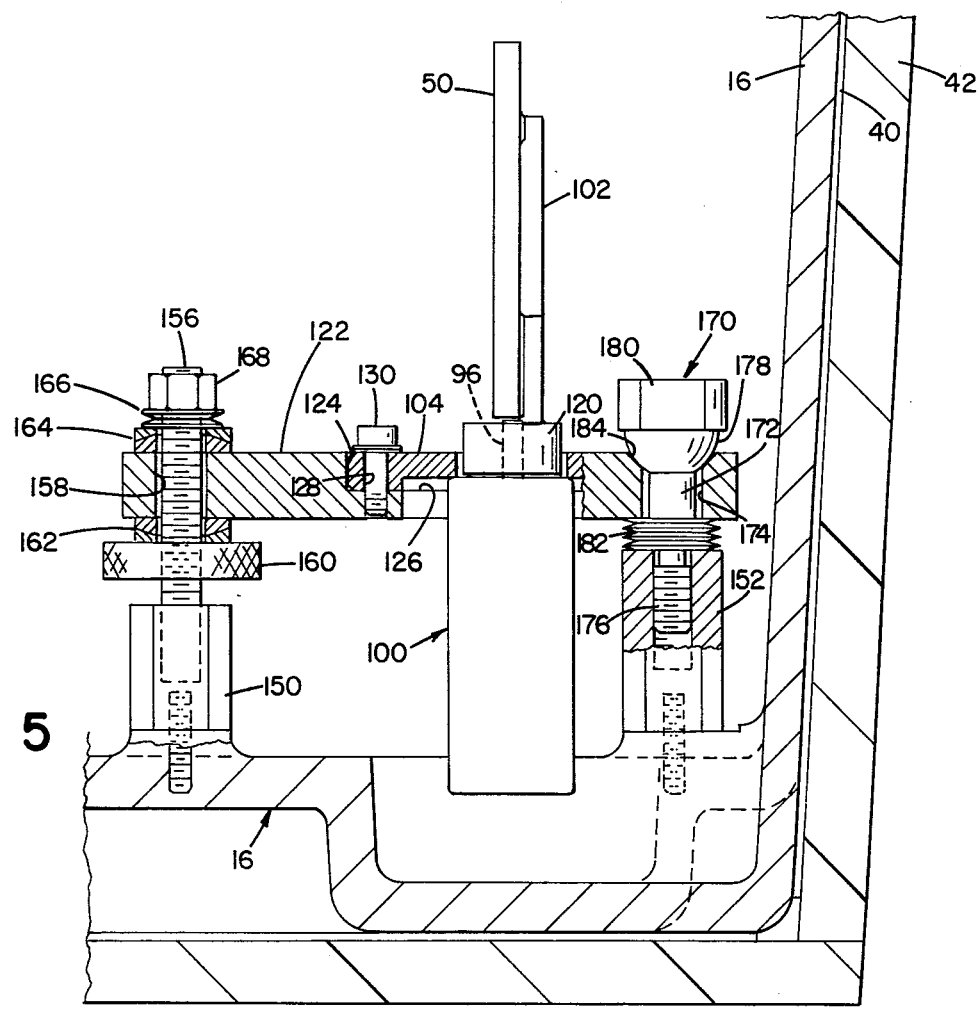
FIG. 5 is a sectional view taken along the line 5—5 of FIG. 4.

Further details of the grating support and drive assembly may be seen with reference to FIGS. 3-5. The case of limited rotation motor 100 (General Scanning Type Z 1552) is secured to support disc 104 by mounting bolts 106. As indicated diagrammatically in FIG. 6, motor 100 has a rotor 110 which is supported by torsion bar 112 for limited rotation and radially stabilized by bearings 114, 116. Its shaft 96 projects upwardly and base 120 of grating holder 102 is clamped to shaft 96 so that grooves of grating 50 are accurately aligned parallel to the axis of rotation of motor rotor 110. A support plate 122 of triangular configuration has a circular recess 124 with an annular support lip 126 on which the periphery of disc 104 is seated—the seating surfaces being finished to 0.0005 inch accuracy. Three elongated slots 128 at the periphery of disc 104 receive clamp bolts 130. A dowel 132 extends radially from disc 104 and is disposed in recess 134 when disc 104 is seated on surface 126. Carried on projection 136 is a spring plunger 138 and threaded carrier member 140. Disposed in opposite projection 142 in opposed aligned relation to plunger 138 is adjusting set screw 144. Dowel 132 is biased by spring plunger 138 against adjustment screw 144 and rotation of screw 144 permits adjustment of support disc 104 over an angular range of about six degrees. When the disc 104 is in the desired position, clamp bolts 130 are tightened to lock that disc in that position.

In addition to the angular adjustment, the support system includes two mutually independent tilt adjustments in planes that are perpendicular to one another. Extending upwardly from the floor of casting 16 are three posts 150, 152, 154. A rod 156 is threaded into each post 150, 154. On each rod 156 is a thumb wheel 160 and seated on the upper surface of each thumb wheel 160 is a spherical washer assembly 162 on which the bottom surface of support plate 122 rests. Disposed on each rod 156 above plate 122 is a second spherical washer pair 164; a pair of spring washers 166; and a hex nut 168. Shank portion 172 of stud 170 passes through bore 174 of support plate 122 and its threaded portion 176 is threaded into post 152. The head of stud 170 has a spherical bearing surface 178 and an upper portion with flats 180. Spring assembly 182 is received over shank 172 and seated between the upper end of post 152 and the lower surface of support plate 122. Formed in the upper end of bore 174 is conical surface 184 which is biased firmly against spherical surface 178 (with a force of about 200 pounds) by spring assembly 182. Rotation of either thumb wheel 160 tilts support plate 122 and the supported assembly of motor 100 and grating 50 about an axis defined by spherical bearing 178. After adjustment of thumb wheel 160, its hex nut 168 is tightened to clamp the support plate and motor-grating assembly in the desired position.

Figure 6:
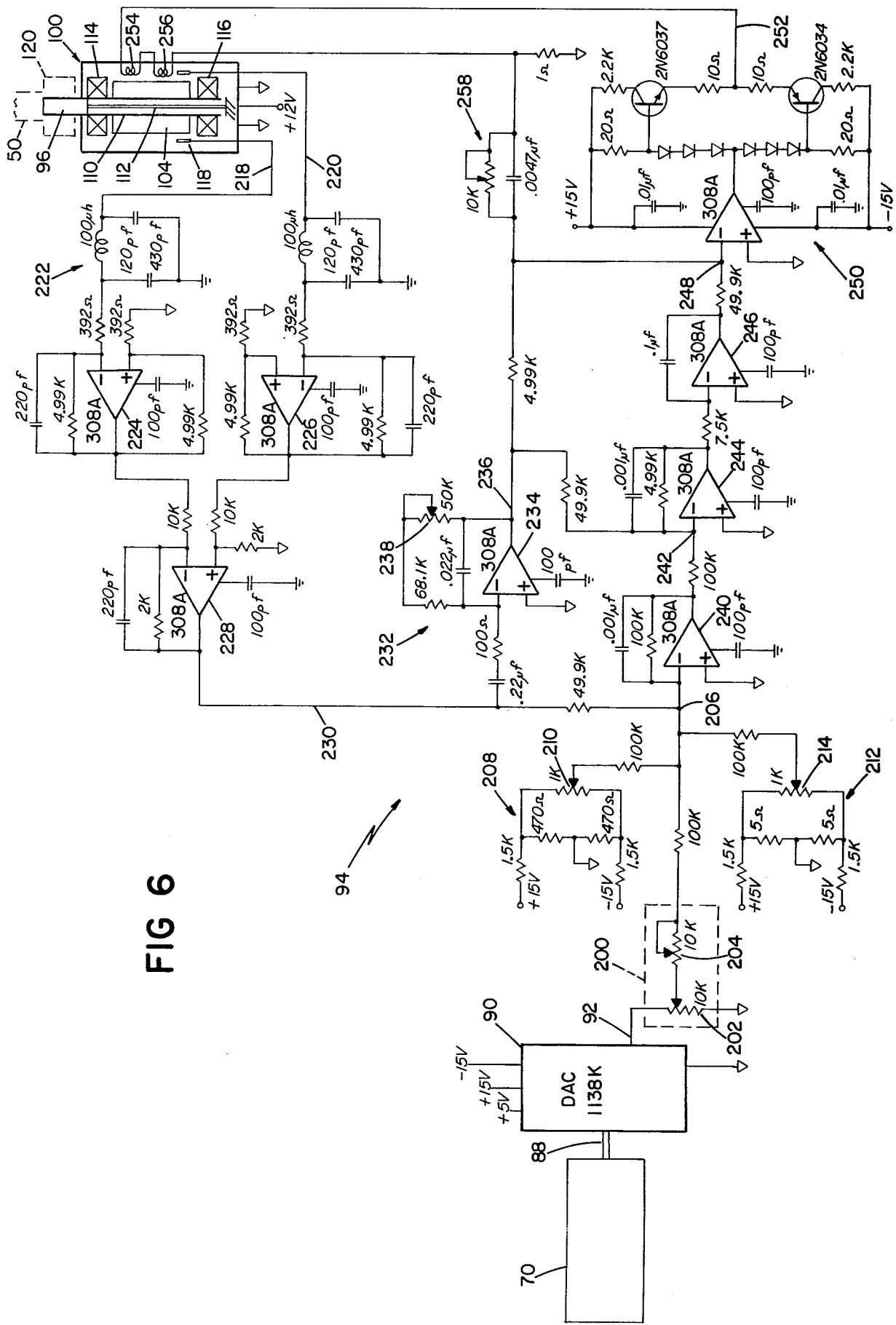
FIG. 6 is a schematic diagram of the servo-amplifier circuitry employed in the system shown in FIG. 1.

Further details of the grating drive system may be had with reference to the schematic diagram of FIG. 6. Controller 70 provides an eighteen bit signal over cable 88 to digital-to-analog convertor 90 and in response that convertor produces an analog voltage over line 92 to gain adjustment network 200 of servo-amplifier 94. That gain adjustment network includes coarse adjustment potentiometer 202 and fine adjustment potentiometer 204. Connected between gain adjustment network 200 and summing point 206 are a coarse offset adjustment network 208 that includes potentiometer 210 and a fine offset adjustment network 212 that includes potentiometer 214.

Rotor position output signals from the capacitance transducer 118 of motor 100 are generated over lines 218 and 220 for application through filter network 222 and differential amplifier circuit that includes amplifiers 224, 226, 228 to generate a positional voltage on line 230 for application to summing point 206. That positional voltage is also applied through differentiator circuit 232 that includes amplifier 234 to generate a velocity signal on line 236. Potentiometer 238 provides a damping adjustment in the differentiator circuit 232. The error signal at summing point 206 as amplified by amplifier 240 is applied to summing point 242 for summing with the velocity (error rate) signal on line 236. The resulting sum of the error and error rate signals are amplified by amplifier 244 and applied to integrator circuit 246. Applied to the summing point 248 of power amplifier 250 are the velocity signal on line 236 and the output of integrator 246, amplifier 250 producing on its output line 252 a drive voltage that is applied to the drive coils 254, 256 of motor 100. Drive voltage gain adjustment circuit 258 is connected in circuit between drive coil 256 and summing point 248.

Wavelength calibration of this monochromator is, in a sense, a continuing process while the instrument is in operation, and is automatically performed by the controller 70. Basically wavelength calibration involves determining the grating angle required to place known reference lines at the selected exit aperture so that the grating angle can then be calculated and a motor-drive voltage generated for the appropriate grating angle for any desired spectral line. The calibration process is done in a series of steps: from a primary calibration to calibrations of increasing accuracy. During initial installation, the mechanical and electrical zeros of grating 50 are set to the 5460 mercury green line. The drive voltage range is ±5 volts and the digital input signal excursion is ±131,072 steps (the range of outputs of convertor 90). Within those excursions, grating 50 is rotated over an angle of ±8½ degrees (a total angle of 17 degrees). The initial or primary calibration step uses three calibration lines from mercury source 26—3650.15 angstroms, 5460.74 angstroms and 7300.30 angstroms. The monochromator makes an intensity scan over the wavelength region of each of these lines to determine the exact position of grating 50 for the peak of the line, and from that grating position determines the binary number input to convertor 90 for each of the three known wavelengths. Those three values are then used by controller 70 in the grating equation to predict the correct binary input required to produce the grating angle for any desired wavelength.

Figure 7:
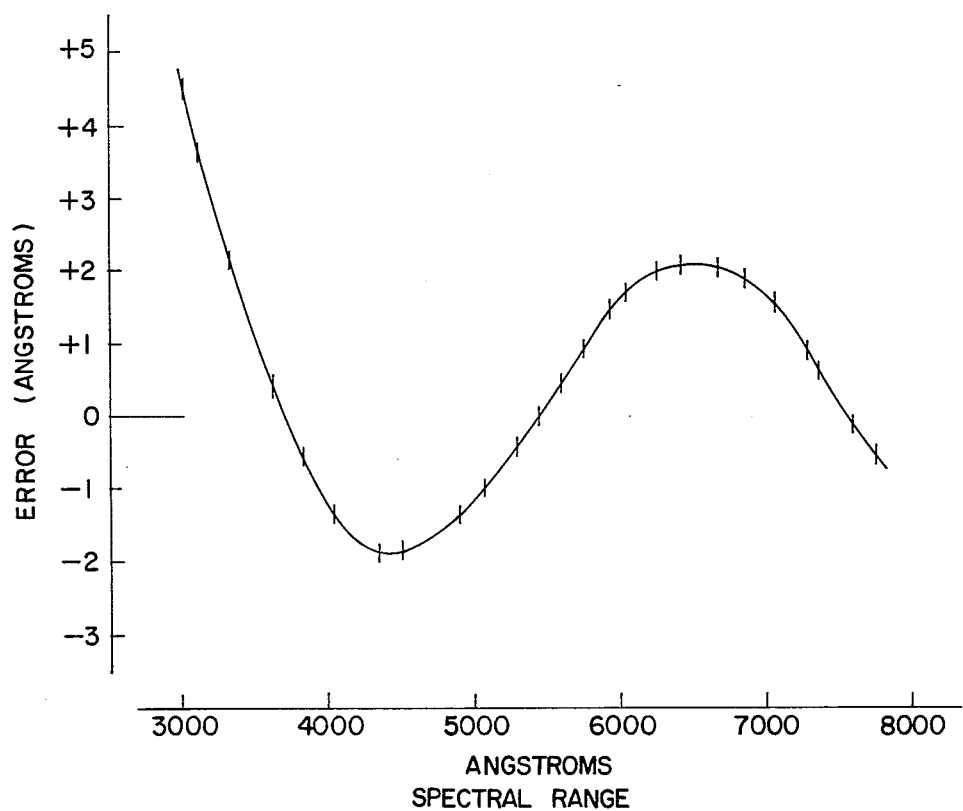
FIG. 7 is a graph illustrating linearity calibration of the grating drive system.

A second calibration accounts for nonlinearity in the wavelength versus grating angle relationship due to the capacitance transducer 118. A typical relationship is as generally indicated in FIG. 7. This second calibration is made by measuring the grating angle (and corresponding binary input values) at the peaks of twenty-five known mercury and argon plasma lines over the 3000–8000 angstrom scan range as set out in the following table:

| Wavelength | Source |
| --- | --- |
| 3021.50 | Hg |
| 3125.66 | Hg |
| 3341.48 | Hg |
| 3650.15 | Hg |
| 3834.68 | Plasma |
| 4046.56 | Hg |
| 4358.35 | Hg |
| 4510.74 | Plasma |
| 4916.04 | Hg |
| 5073.04 | Hg |
| 5304.08 | Hg |
| 5460.74 | Hg |

-continued

| Wavelength | Source |
| --- | --- |
| 5606.94 | Hg |
| 5769.59 | Hg |
| 5934.56 | Hg |
| 6043.00 | Hg |
| 6251.32 | Hg |
| 6416.32 | Plasma |
| 6682.96 | Hg |
| 6871.29 | Plasma |
| 7067.22 | Plasma |
| 7300.30 | Hg |
| 7383.98 | Plasma |
| 7609.56 | Hg |
| 7771.93 | Plasma |

The resulting data is normalized by controller 70 to the primary calibration through a fifth order polynomial to provide a compensated binary value for any desired grating angle over the 17 degree range.

This calibration procedure permits the grating 50 to be moved to the returned to any desired wavelength location within an accuracy of better than 0.03 angstrom. Grating 50 also returns to its rest position (5460 angstroms) after each measurement. To minimize the uncertainty in this rest position, after each measurement the monochromator scans over a ±0.20 angstrom window and checks for an intensity maximum in the window that is at least ten times the detection limit.

The monochromator system also similarly derives binary input values with respect to each of the three photomultiplier tubes. The change in angle ($\alpha$) due to use of one of the secondary slits (56 or 60) is approximately 0.66 degree. Thus, for the "visible" slit 56 the off axis angle is 12.89 degrees and for the UV slit 60, the off axis angle is 11.57 degrees. The measurement of a single line for each of the secondary slits 56, 60, provides sufficient information to modify all the grating equation values for those optical systems. The high voltage for each selected axis slit is adjusted to the desired value depending on the wavelength of interest.

After the system has been calibrated, during each spectrochemical analysis, controller 70, in response to a desired wavelength value inputted by computer 82, generates an eighteen bit binary number which is converted by convertor 90 to an analog voltage that is applied to servo-amplifier 94, and the output of that amplifier operates limited rotation motor 100 to rotate grating 50 to position the desired portion of the dispersed spectrum at the selected exit slit. Between sample analyses, the system is recalibrated by interposing mirror 22 on optical axis 18 to reflect radiation from calibration source 26 through entrance slit 20 and the calibration sequence is checked by controller 70 with "real time" adjustment as necessary to compensate for changes in environmental conditions such as temperature or barometric pressure.

While a particular embodiment of the invention has been shown and described, various modifications will be apparent to those skilled in the art, and therefore it is not intended that the invention be limited to the disclosed embodiment or to details thereof, and departures may be made therefrom within the spirit and scope of the invention.

What is claimed is:

1. A scanning monochromator system comprising a housing, structure in said housing defining an entrance aperture, structure in said housing defining an exit aperture, a radiation dispersing component in said housing arranged to disperse radiation passing through said entrance aperture into a spectrum for transmission towards said exit aperture, an electromagnetic drive transducer, said dispersing component being directly coupled to said electromagnetic drive transducer, and support structure for mounting the assembly of a rotary component of said drive transducer and said dispersing component for rotation as a unit about a stationary axis that is perpendicular to the optical axis of the system so that a selected portion of the radiation dispersed by said dispersing component is passed through said exit aperture, said support structure including first adjustment means for rotating said assembly about its axis of rotation, and a second adjustment means for tilting said assembly about a fixed pivot offset from the assembly axis, said drive transducer being adapted to move said selected portion of dispersed radiation at said exit aperture over a wavelength range of at least 3000 angstroms.

2. The system of claim 1 wherein said housing provides environmental isolation and electromagnetic shielding, and further including heater pads on the walls of said housing, and a temperature controller responsive to a temperature sensor within said housing for maintaining the temperature in said housing at a predetermined value.

3. A scanning monochromator system of the atomic emission type comprising structure defining an entrance aperture, structure defining an exit aperture, a collimating component disposed to receive divergent rays of radiant energy passed through said entrance aperture and to render those divergent rays substantially parallel, a radiation dispersing component arranged to receive the substantially parallel rays from said collimating component and to disperse those rays into a spectrum, a focusing component arranged to receive said dispersed radiation and to focus that dispersed radiation adjacent said exit aperture, and an electromagnetic drive transducer, said dispersing component being directly coupled to said electromagnetic drive transducer with the assembly of a rotary component of said drive transducer and said dispersing component being mounted for rotation as a unit about a stationary axis that is perpendicular to the optical axis of the system.

4. The system of either claim 1 or 3 and further including a controller for generating a digital input signal of at least sixteen binary digits that specifies a desired dispersing component angular position, a position transducer coupled to said drive transducer for producing an output signal indicative of the actual angular position of said dispersing component, and servo-amplifier circuitry that has a first summing point responsive to the angular position input signal and the position transducer output signal for accurately positioning said dispersing component at the desired angular position.

5. The system of either claim 1 or 3 wherein said dispersing component is a diffraction grating that has at least 50 grooves per millimeter.

6. The system of either claim 1 or 3 wherein the mass of said grating is greater than that of the rotary component of said drive transducer.

7. The system of either claim 1 or 3 wherein said drive transducer moves said grating over the entire width of said wavelength range in less than one second.

8. The system of claim 7 wherein said drive transducer is a limited rotation motor having a torsion bar which resiliently supports both the rotor of said motor and said grating, and said position transducer is a capacitance rotor position transducer.

9. The system of claim 4 wherein said servo-amplifier includes a differential amplifier responsive to said position transducer, a second summing point which an error rate signal is summed with the error signal, and an integrator stage; said system positioning said dispersing component at any particular wavelength of interest with an accuracy of better than 0.1 angstrom in less than one second.

10. The system of claim 4 wherein said exit aperture defining structure defines a plurality of spaced exit slits that are located at different system off-axis angles, and further including a plurality of sensors that have different sensitivities to different portions of the spectral wavelength range of the analysis system, each said sensor being located behind a corresponding exit slit, said controller selecting a particular sensor and the corresponding off-axis angle as a function of the wavelength of interest.

11. The system of claim 3 and further including support structure for said dispersing component drive transducer assembly, said support structure including first adjustment means for rotating said assembly about its axis of rotation, and second adjustment means for tilting said assembly about a fixed pivot offset from the assembly axis.

12. The system of claim 11 wherein said support structure includes a support plate that is biased against a spherical bearing surface that defines said fixed pivot, said second adjustment means is adapted to tilt said support plate relative to said spherical bearing surface, and said first adjustment includes a support disc that is fixed to said dispersing component-drive transducer assembly and is mounted for rotation, and biasing means for urging said assembly against an adjustable angular reference member.

13. The system of any one of claims 1, 3 or 12 wherein said system further includes an induction coupled plasma type of sample excitation source into which a spectroscopic sample to be analyzed is introduced for raising the sample to spectroemissive levels, a calibrating radiation source having a plurality of discrete known spectral lines, and means for selectively directing radiation from said calibrating source to said entrance aperture.

14. The system of any one of claims 3, 2 or 11 wherein said monochromator has a wavelength range of at least 3000 angstroms and a speed of at least f 20.

15. The system of claim 3 and further including a controller for generating a digital input signal of at least sixteen binary digits that specifies a desired dispersing component angular position, a position transducer coupled to said drive transducer for producing an output signal indicative of the actual angular position of said dispersing component, and servo-amplifier circuitry that has a first summing point responsive to the angular position input signal and the position transducer output signal for accurately positioning said dispersing component at the desired angular position, a differential amplifier responsive to said position transducer, a second summing point which an error rate signal is summed with the error signal, and an integrator stage; said system positioning said dispersing component at any particular wavelength of interest with an accuracy of better than 0.1 angstrom in less than one second.

16. The system of claim 15 wherein said drive transducer moves said grating over the entire width of said wavelength range in less than one second.

17. The system of claim 16 wherein said dispersing component is a diffraction grating that has at least 1000 grooves per millimeter.

18. The system of claim 17 wherein said system further includes an induction coupled plasma type of sample excitation source into which a spectroscopic sample to be analyzed is introduced for raising the sample to spectroemissive levels, a calibrating radiation source having a plurality of discrete known spectral lines, and means for selectively directing radiation from said calibrating source to said entrance aperture.

19. The system of claim 17 wherein said exit aperture defining structure defines a plurality of spaced exit slits that are located at different system off-axis angles, and further including a plurality of sensors that have different sensitivities to different portions of the spectral wavelength range of the analysis system, each said sensor being located behind a corresponding exit slit, said controller selecting a particular sensor and the corresponding off-axis angle as a function of the wavelength of interest.

20. The system of claim 19 and further including support structure for said dispersing component-drive transducer assembly, said support structure including first adjustment means for rotating said assembly about its axis of rotation, and second adjustment means for tilting said assembly about a fixed pivot offset from the assembly axis.

21. The system of claim 20 wherein said support structure includes a support plate that is biased against a spherical bearing surface that defines said fixed pivot, said second adjustment means is adapted to tilt said support plate relative to said spherical bearing surface, and said first adjustment includes a support disc that is fixed to said dispersing component-drive transducer assembly and is mounted for rotation, and biasing means for urging said assembly against an adjustable angular reference member.

* * * * *